(12) United States Patent
Gourley et al.

(10) Patent No.: US 10,984,171 B2
(45) Date of Patent: Apr. 20, 2021

(54) DYNAMIC PRESENTATION OF CONTENT BASED ON PHYSICAL CUES FROM A CONTENT CONSUMER

(71) Applicant: Primer Technologies, Inc., San Francisco, CA (US)

(72) Inventors: Sean Gourley, San Francisco, CA (US); John Bohannon, San Francisco, CA (US)

(73) Assignee: Primer Technologies, Inc., San Francisco, CA (US)

( * ) Notice: Subject to any disclaimer, the term of this patent is extended or adjusted under 35 U.S.C. 154(b) by 0 days.

(21) Appl. No.: 16/419,546

(22) Filed: May 22, 2019

(65) Prior Publication Data

US 2020/0034409 A1 Jan. 30, 2020

Related U.S. Application Data

(60) Provisional application No. 62/712,127, filed on Jul. 30, 2018.

(51) Int. Cl.
*G06F 17/00* (2019.01)
*G06F 40/106* (2020.01)
*G06K 9/00* (2006.01)

(52) U.S. Cl.
CPC ....... *G06F 40/106* (2020.01); *G06K 9/00302* (2013.01)

(58) Field of Classification Search
CPC .. G06F 40/106; G06F 40/103; G06K 9/00302
See application file for complete search history.

(56) References Cited

U.S. PATENT DOCUMENTS

| | | | |
|---|---|---|---|
| 8,707,185 B2* | 4/2014 | Robinson | G06F 3/0481 705/319 |
| 9,069,772 B2* | 6/2015 | Callery | G06F 40/103 |
| 9,355,366 B1* | 5/2016 | Young | G06K 9/00718 |
| 10,321,190 B2* | 6/2019 | Goyal | H04N 21/4667 |
| 10,515,561 B1* | 12/2019 | Fieldman | H04N 21/47205 |
| 2012/0236201 A1* | 9/2012 | Larsen | H04N 21/439 348/468 |
| 2013/0121591 A1* | 5/2013 | Hill | G10L 15/1815 382/195 |
| 2013/0235073 A1* | 9/2013 | Jaramillo | G09G 5/00 345/619 |
| 2014/0223462 A1* | 8/2014 | Aimone | G16H 40/67 725/10 |
| 2014/0281850 A1* | 9/2014 | Prakash | G06F 40/117 715/202 |

(Continued)

*Primary Examiner* — Laurie A Ries (57) ABSTRACT

The technology disclosed herein presents content dynamically based on physical cues received from a consumer of the presented content. In a particular implementation, a method provides determining first content items for presentation to a user and determining a first sequence in which the first content items should be presented to the user. During presentation of the first content items in the first sequence to the user, the method provides identifying at least one physical cue from the user and modifying the first sequence based on the at least one physical cue to create a second sequence in which the first content items should be presented to the user. The method then provides presenting the first content items to the user in the second sequence.

20 Claims, 7 Drawing Sheets

(56) References Cited

U.S. PATENT DOCUMENTS

| | | | |
|---|---|---|---|
| 2016/0110313 A1* | 4/2016 | Prakash | G06F 40/197 |
| | | | 715/202 |
| 2017/0187811 A1* | 6/2017 | Thomee | H04L 65/4069 |
| 2018/0278984 A1* | 9/2018 | Aimone | A61B 5/0476 |
| 2019/0066664 A1* | 2/2019 | Miller | G10L 15/26 |
| 2019/0238952 A1* | 8/2019 | Boskovich | G06K 9/00201 |
| 2020/0126437 A1* | 4/2020 | Fieldman | H04N 21/2187 |

\* cited by examiner

DYNAMIC PRESENTATION OF CONTENT BASED ON PHYSICAL CUES FROM A CONTENT CONSUMER

RELATED APPLICATIONS

This application is related to and claims priority to U.S. Provisional Patent Application 62/712,127, titled "DYNAMIC PRESENTATION OF CONTENT BASED ON PHYSICAL CUES FROM A CONTENT CONSUMER," filed Jul. 30, 2018, and which is hereby incorporated by reference in its entirety.

TECHNICAL BACKGROUND

The amount of electronic content available for consumption by users is staggering. The content may come in the form of various types of media, such as text, audio, video, images, etc. and may be accessed by a user operating a computing device connected to a network, such as the Internet. Given the vast amounts of content available, a user may have trouble discovering and deciding what content they would like to consume. In many cases, the user may be unaware that content in which they would be interested even exists. Moreover, once content has been discovered for the user, the ordering of that content may affect the user's enjoyment of the content. For example, a first item of content may be upsetting to the user and presenting another upsetting item of content to the user right after the first content item may discourage the user from continuing with the consumption of the content.

OVERVIEW

The technology disclosed herein presents content dynamically based on physical cues received from a consumer of the presented content. In a particular implementation, a method provides determining first content items for presentation to a user and determining a first sequence in which the first content items should be presented to the user. During presentation of the first content items in the first sequence to the user, the method provides identifying at least one physical cue from the user and modifying the first sequence based on the at least one physical cue to create a second sequence in which the first content items should be presented to the user. The method then provides presenting the first content items to the user in the second sequence.

In some embodiments, modifying the first sequence includes determining second content items for presentation to the user based on the at least one physical cue and amending the first content items with the second content items in the second sequence. In these embodiments, amending the first content items may include adding the second content items to the first content items and/or replacing one or more of the first content items with the second content items.

In some embodiments, identifying the at least one physical cue comprises recognizing a first reaction of the user towards currently presented content of the first content items. In these embodiments, modifying the first sequence to create the second sequence may include rearranging ones of the first content items to be presented subsequently to the currently presented content to ones of the first content items that will elicit a similar or opposite reaction to the first reaction. Also in these embodiments, recognizing the first reaction may include capturing a facial expression of the user indicating the first reaction and/or measuring a heart rate of the user indicating the first reaction.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to determine first content items for presentation to a user and determine a first sequence in which the first content items should be presented to the user. The program instructions further direct the processing system to, during presentation of the first content items in the first sequence to the user, identify at least one physical cue from the user and modify the first sequence based on the at least one physical cue to create a second sequence in which the first content items should be presented to the user. The program instructions then direct the processing system to present the first content items to the user in the second sequence.

DETAILED DESCRIPTION

There exist many ways for which a user can consume content via a computing device, such as a smartphone, laptop, tablet, personal computer, television, etc. Individual content items may take the form of video, audio, images, text documents, graphics, or some combination thereof. The content may be obtained from numerous different sources, such as websites, subscription services, applications, etc. With the vast number of content sources available over a computing network, such as the Internet, a user's ability to sort through all of these sources may be limited by the user's time, knowledge about what sources exist, knowledge about the content provided (e.g., what subjects/topics are typically covered by a content source), or some other reason that limits a user's ability to curate their own content presentation.

Additionally, even if a user is able to select the content for presentation, the sequence in which that content is presented may affect the user's experience. For instance, a common manner for presenting content items is to present the content items in the order in which the content items were published or added to the presentation queue. Such sequencing does not necessarily provide the user with the best content consumption experience because it, at least in part, fails to account for the user's reactions to the content being presented. As such, if a user reacts poorly to an item of content, it may be best to avoid presenting similar content, at least for a period of time. The examples below describe how the sequence in which content items are presented may be dynamically changed depending on physical feedback from the user, which can be used to help avoid the situation in the above example or otherwise make the content consumption experience better for the user.

Figure 1:
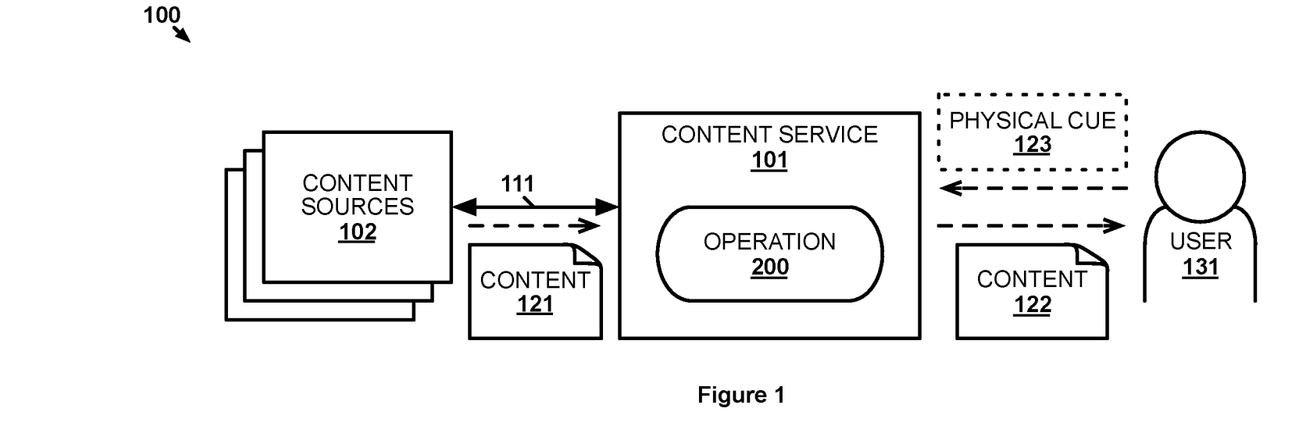
FIG. 1 illustrates a computing environment for dynamically managing content presentation.

FIG. 1 illustrates computing environment 100 for dynamically managing content presentation. Computing environment 100 includes content service 101 and content sources 102. Content service 101 and content sources 102 communicate over communication link(s) 111. Communication link(s) 111 may be direct data links to information sources 102 or may include intervening systems, networks, and devices, such as the internet or local area networks.

Content sources 102 maintain and provide content items 121, such as text news stories, video news stories, audio news stories, documents, social media posts, images, graphs, and other similar objects to provide information about various topics. For example, a content source in content sources 102 may be a news media website that provides a news article (i.e., content item) for a death of a diplomatic leader. Content items 121 are obtained by content service 101 to for provision to user 131. In particular, content service 101 performs operation 200 to present user 131 with content items 122 in a dynamic sequence. Content items 122 may include all of content items 121 or may include only a subset of content items 121 depending on how content items 122 are sequenced for presentation by content service 101.

Figure 2:
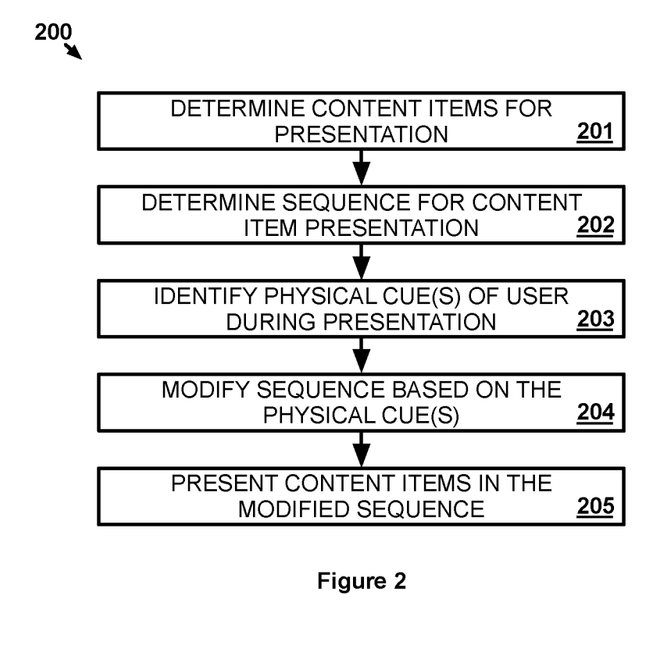
FIG. 2 illustrates an operation of the computing environment to dynamically manage content presentation.

FIG. 2 illustrates operation 200 to dynamically manage content presentation. In operation 200, content service 101 determines content items 121 for presentation to user 131 (201). Content service 101 may determine content items 121 by identifying content items from content sources 102 based on parameters provided by user 131 (e.g., topics/content sources of interest to user 131), default parameters (e.g., topics/content sources predetermined to be of interest to a large number of users), topics that are currently trending, (e.g., trending on social media), or some other type of criteria for differentiating between the content available from content sources 102—including combinations thereof. In some cases, user 131 may indicate specific content items that should comprise at least a portion of content items 121.

Content service 101 determines a first sequence in which content items 121 should be presented to user 131, which results in content items 122 in this example (202). The order in which content items 121 are sequenced to form content items 122 may be random, arbitrary, based on publishing time for each content item (e.g., newest to oldest), based on an occurrence time of a topic in each content item, based on how popular a content item is with other consumers (e.g., whether the content item or topic therein is trending on social media), or based on some other criteria—including combinations thereof.

During presentation of content items 122 in the first sequence to user 131, content service 101 identifies at least one physical cue 123 from the user (203). Physical cue 123 may be a facial expression/movement, a body position/movement, biometric information captured from user 131 (e.g., heart rate, blood pressure, etc.), or some other factor produced by user 131's body—including combinations thereof. Various sensors, such as photo, video, audio, heart rate, 3D mapping, etc., may be included in content service 301 or otherwise accessible by content service 301 (e.g., via a user system of user 131) to capture the physical cues that are identified by content service 301. Such physical cues may indicate user 131's reaction to whichever of content items 122 is being presented to user 131 when the physical cue is detected. The physical cue may indicate that user 131 may be happy, sad, angry, confused, bored, or feeling some other type of emotion in reaction to the content item being presented. Multiple physical cues may be detected during presentation of a single content item. In some cases, content service 101 may be able to correlate a physical cue to a specific portion of the content item currently being viewed by user 131 when the physical cue occurred. For example, content service 101 may use gaze detection on visual content items such as a document, video, or photo to determine where user 131 was looking or may register the current timestamp of a video or audio content item being played.

Content service 101 modifies the sequence of content items 122 based on the at least one physical cue to create a second sequence for content items 122 to be presented to user 131 (204). The second sequence may change the content item of content items 122 that content service 101 presents to user 131 after the content item currently being presented. As mentioned above, the physical cue may indicate a reaction that user 131 is having to the currently presented content. Content service 101 may then refer to instructions for how to re-sequence content items 122 depending on what reaction is indicated. These instructions may be a default set of instructions, may be provided, at least in part, by user 131, may be inferred based on user 131's observed content consumption habits over time (e.g., content service 101 may monitor how user 131 handles content items after detecting particular reactions, such as stopping consumption after an upsetting content item is presented), or may be provided to content service 101 in some other manner. In some examples, the second sequence may reorder the content items already in content items 122 (at least those that have not already been presented) while other examples may include new content items of content items 121, some of which may need to be retrieved by content service 101.

The instructions may indicate that, upon detecting a positive reaction to a content item, similar content items should be in sequence after the currently presented content item to evoke more positive reactions by user 131. Alternatively, upon detecting a negative reaction to a content item (e.g., anger or sadness), the instructions may indicate that different content items should be in sequence after the currently presented content item to evoke an opposite reaction. If available, a content item on the same or similar topic may be presented for continuity of topic to evoke the desired reaction or content service 101 may be on an unrelated topic. In another example, content service 101 may determine that user 131 has a confused reaction to the currently presented content. The instructions may indicate that content service 101 should identify a content item that would explain the currently presented content and place that content item next in sequence for presentation after the currently presented content.

Also, as noted above, multiple physical cues may be identified during the presentation of a single content item. Those multiple physical cues may be combined to indicate a single reaction or may represent multiple reactions to various portions of a single content item. In the latter cases, the instructions may include instructions for how to handle situations where multiple reactions occurred. For example, the instructions may indicate that content service 101 should handle re-sequencing in accordance with the most prominent reaction or in accordance with the last captured reaction.

Once the sequence has been modified into the second sequence, content service 101 presents content items 122 to user 131 in the second sequence (205). Thus, rather than content items subsequent to the currently presented content item being presented in the original sequence, content service 101 employed the physical cue(s) of user 131 to provide a sequence more tailored to user 131 experience. Since user 131 does not need to actively provide feedback to content service 101, content service 101 may be configured to re-sequence content items without user 131 knowing that the re-sequencing is happening. As further content items of content items 122 are presented to user 131, content service 101 may continue to identify physical cues from user 131 and re-sequence the ones of content items 122 yet to be presented to user 131 in accordance with operation 200.

It should be understood that, while content service 101 is shown as a single element, content service 101 may be distributed across multiple computing systems and/or devices. In one example, content service 101 may be implemented entirely in a user system, such as a laptop, smartphone, or tablet, of user 131. In another example, content service 101 may be implemented on one or more computing systems remote to user 131 (e.g., as a cloud service). In those examples, content service 101 presents content items 122 to user 131 by transferring content items 122 to user 131's user system either one at a time in sequence or in one or more batches with the sequence otherwise indicated to the user system. Similarly in those examples, content service 101's ability to identify physical cues would likely use the user system of user 131, or another system/device associated therewith, to capture the physical cues of user 131 and indicate them to content service 101.

Figure 3:
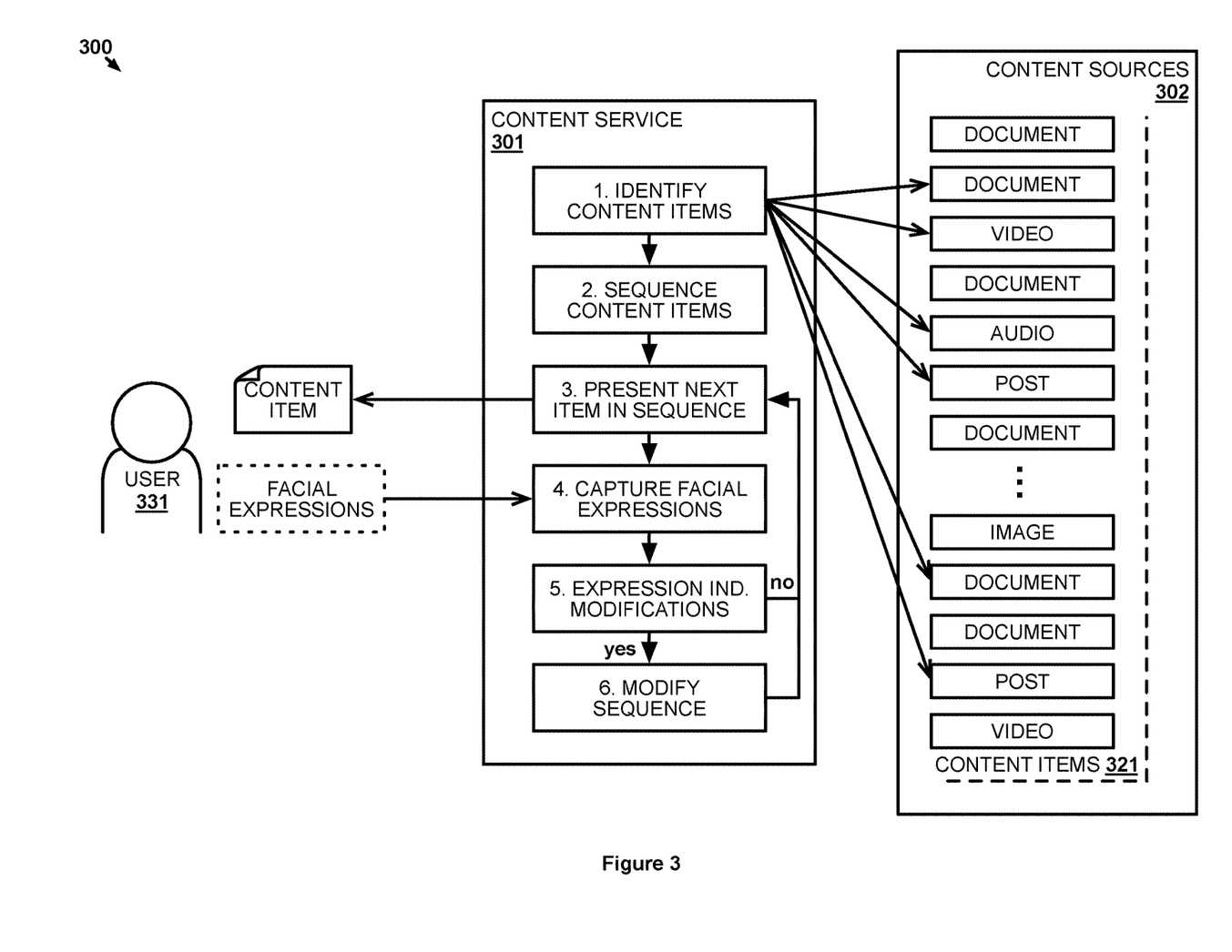
FIG. 3 illustrates another computing environment for dynamically managing content presentation.

FIG. 3 illustrates computing environment 300 for dynamically managing content presentation. Computing environment 300 includes content service 301 and one or more content sources 302. Content sources 302 may comprise databases and/or websites capable of maintaining and providing content items 321, such as articles, images, videos, social media posts, and other similar objects to provide information about various topics. Text based data objects, such as articles, are considered documents within content items 321 although they may include other types of media therein (e.g., images, graphics, video/audio clips).

In operation, content service 301 identifies content items at step 1 from content items 321 for presentation to user 331. The content items may be identified based on user topic/source preferences, popular/trending topics, previously viewed topics/sources, or based on some other selection criteria. The initial selection of content items may include any number of content items of two or more to be able to sequence those content items. In this example, content service 301 selects six content items for presentation to user 331. The selected content items may be retrieved by content service 301 upon being selected or content service 301 may only retrieve a content item once the content item is ready to be presented. The selected content items are sequenced at step 2 based on an initial sequence determination. The initial sequence determination is not based on physical cues from user 331 and may be based on any other type of information. The initial sequence may even be arbitrary or random. In one example, content service 301 may simply place the content items in the same order in which the content items were identified from content sources 302.

Once at least the first content item has been sequenced, the first/next content item in the sequence is presented at step 3 to user 331. Content service 301 may include a user interface to present the content item itself or may present the content item by transferring the content item to a user system operated by user 331. During presentation of the first content item, content service 301 captures physical cues, facial expressions in this example, at step 4 from user 331. Like with the presentation of the content item, content service 301 may include components necessary to capture the facial expressions itself or may capture facial expressions by relying on a user system in visual range of user 331, such as the user system presenting the content item.

Content service 301 then determines at step 5 whether the facial expression(s) captured from user 331 indicate that the sequence for presenting the identified content items should be modified. That is, content service 301 determines what characteristics the next content item in the sequence should have and, if the next content item in the sequence has those characteristics, then no modification is needed to the sequence. Characteristics of a content item may include the type of content item (e.g., document, video, audio, etc.), the length of the content item, the topic of the content item, the tone of the content item (e.g., funny, serious, sad, etc.), the author of the content item, the source of the content item, or some other characteristic that might influence what reaction a user may have to the content item.

If no modification is necessary, then content service 301 returns to step 3 to present the next content item in the sequence once user 331 is finished with the currently presented content item. However, if a modification is necessary, content service 301 modifies the sequence of content items at step 6 such that the next content item in the sequence has the desired characteristics. In some examples, content service 301 may modify more than just which content item comes next in the sequence to potentially reduce the number of times the sequence will need to be modified in the future. After modifications have been made, content service 301 returns to step 3 to present the next content item in the sequence once user 331 is finished with the currently presented content item. The next content item in this case is different from the next content item would have been if no modifications were made. In some examples, rather than modifying the immediately subsequent content item in the sequence, content service 301 may determine that the next content item is fine as is and modify the sequence further down the line.

Content service 301 will then repeat steps 3-6 until all of the selected content items have been presented, including any further content items that are identified as part of a sequence modification. In some examples, given the near limitless amount of content available over the Internet, content service 301 may continue to identify more and more content items for presentation to user 331 and add those items to the sequence to ensure user 331 always has content to consume.

Figure 4:
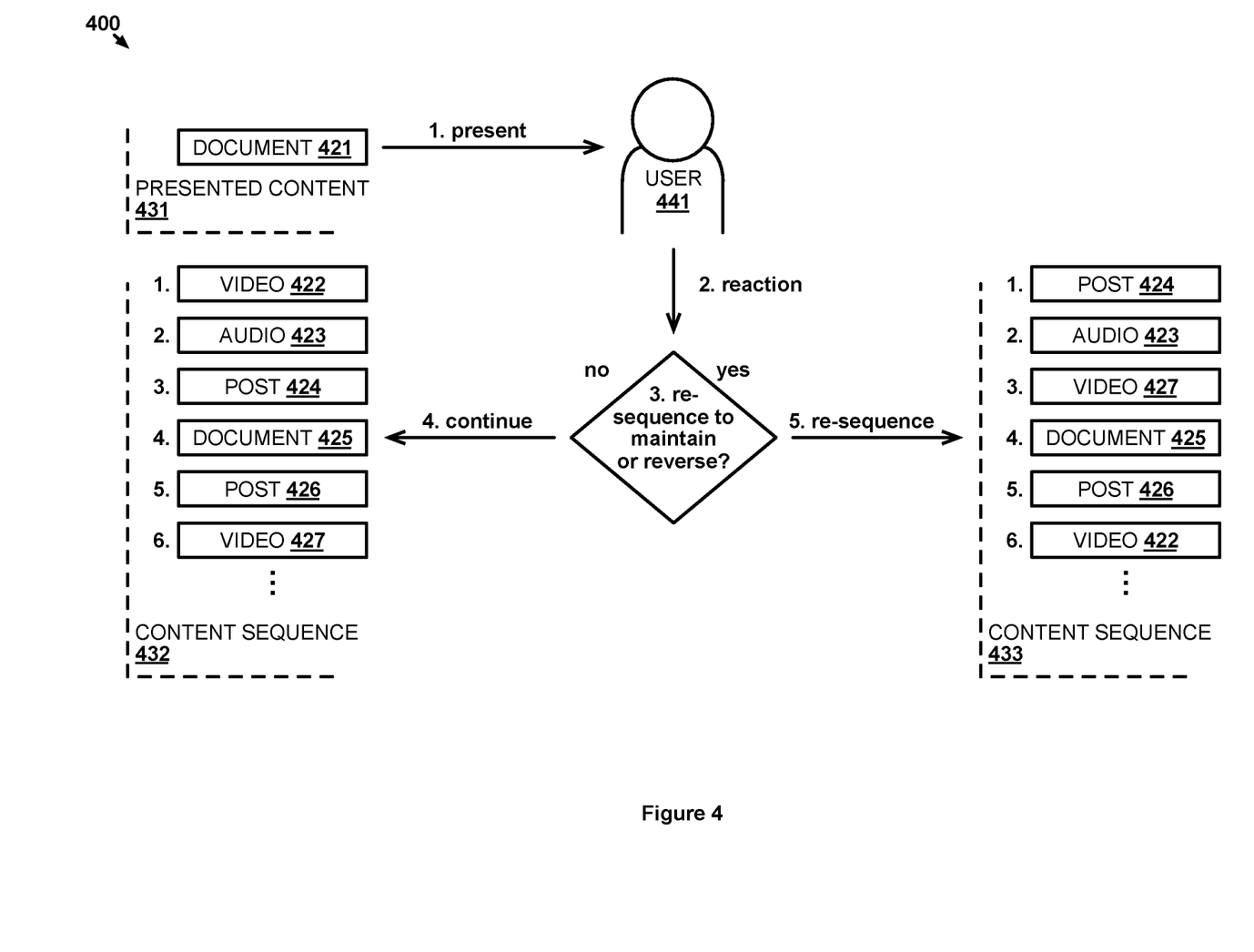
FIG. 4 illustrates an operational scenario for dynamically managing content presentation.

FIG. 4 illustrates operational scenario 400 for dynamically managing content presentation. Operational scenario 400 describes how a content sequence may be modified by content service 301 of computing environment 300. Specifically, operational scenario 400 shows presented content 431 as the content being current presented at step 1 to user 441. In this case, document 421 is presented content 431. During presentation of document 421 to user 441, user 441 reacts at step 2 to document 421, which presents as a physical cue that can be captured by a computing system or device co-located with user 441. The computing system or device may be content service 301 itself or may be a system/device in communication with content service 301.

Content service 301 then determines at step 3 whether content sequence 432 should be modified. In particular, content service 301 determines whether the reaction of user 441 to document 421 should be reversed or maintained. For example, content service 301 may have instructions to reverse bad reactions, such as anger, sadness, or boredom, while maintaining good reactions, such as happiness, humor, or intrigue. If content sequence 432 is determined to be sufficient for achieving content service 301's goal, whether that goal is to reverse or maintain user 441's reaction, then content service 301 continues to present content items in accordance with content sequence 432. In this case, that means, after user 441 is finished with document 421, video 422 becomes presented content 431 followed in order by audio 423, social media post 424, document 425, social media post 426, and video 427.

If content service 301 determines that content sequence 432 is not sufficient for achieving content service 301's goal, then content service 301 re-sequences the content items within content sequence 432 to a sequence that will satisfy that goal. In this case, content sequence 433 is created whereby after user 441 is finished with document 421, social media post 424 becomes presented content 431 followed in order by audio 423, video 427, document 425, social media post 426, and video 422. For example, the reaction of user 441 may indicate that user 441 is bored from reading document 421. To counteract that boredom, content service 301 re-sequenced the content items such that an entertaining social media post 424 is presented next to provide entertainment to user 441, thereby improving user 441's content consumption experience.

Figure 5:
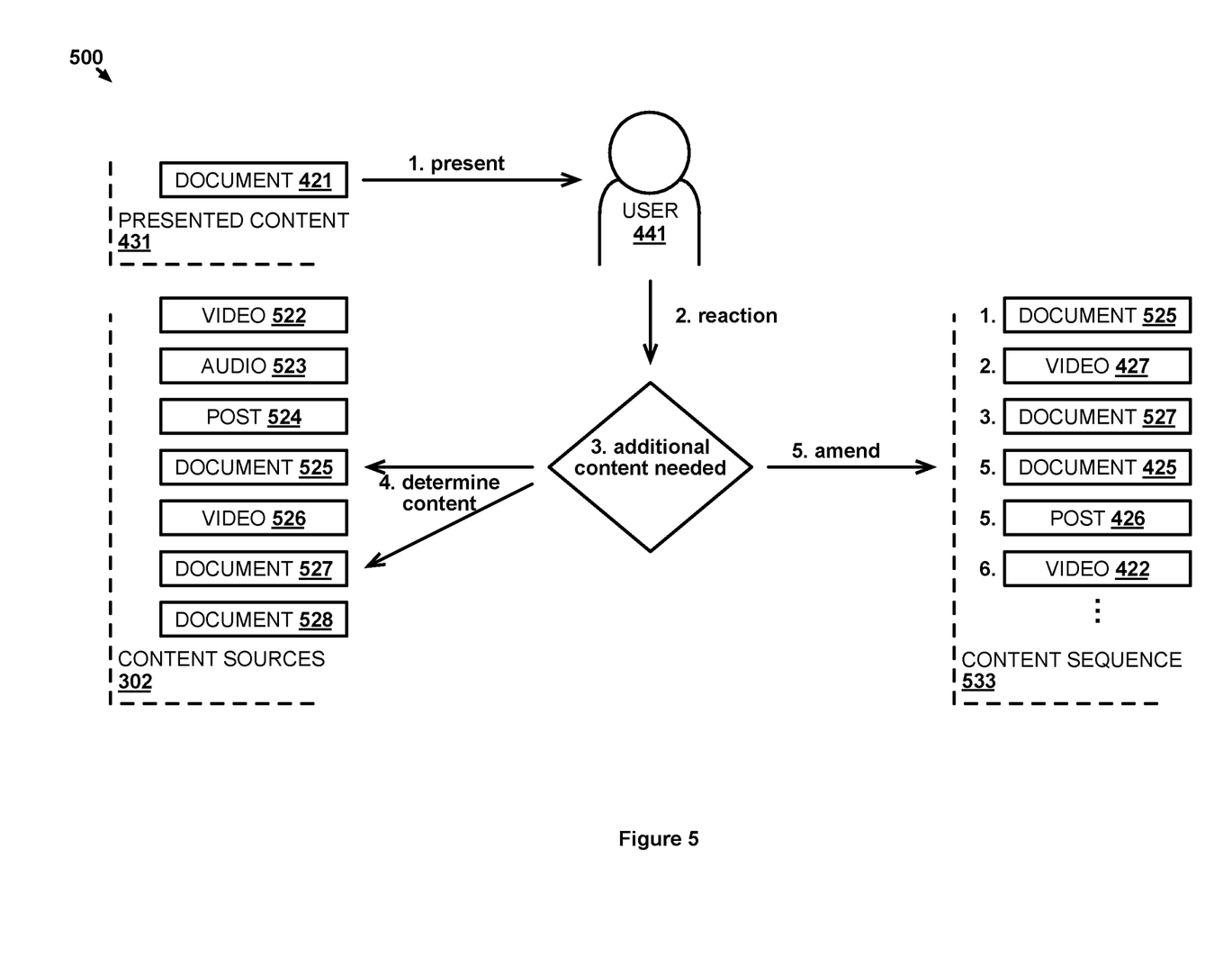
FIG. 5 illustrates another operational scenario for dynamically managing content presentation.

FIG. 5 illustrates operational scenario 500 for dynamically managing content presentation. Operational scenario 500 is similar to operational scenario 400 only the re-sequencing in operational scenario 500 includes amending in additional content. Like in operational scenario 400, document 421 is the currently presented content 431 being presented at step 1 to user 441. A reaction is similarly captured at step 2 from user 441 during presentation of document 421. Instead of simply re-ordering the content items already in content sequence 432, as was performed in operational scenario 400, content service 301 in operational scenario 500 determines at step 3 that additional content is needed to achieve content service 301's goal for re-sequencing. That is, if the currently available content items in content sequence 432 do not have characteristics that content service 301 determines are needed to reverse or maintain user 441's reaction, as determined in operational scenario 400, then content service 301 will search content sources 302 at step 4 to determine additional content items having the desired characteristics.

Content service 301 may search different sources of content sources 302 for the additional content items than those sources from where content items in content sequence 432 were found or may still search the same sources because the characteristics of the content items being searched for are likely different than they were previously. In this example, content service 301 determines that document 525 and document 527 should be amended into content sequence 432. Responsive to identifying document 525 and document 527, content service 301 amends document 525 and document 527 at step 5 into content sequence 432 to generate content sequence 533. In this example, video 422 is replaced with document 525 at position 1 and moved down to position 6, video 427 is moved up to position 2, social media post 424 is replaced with document 527 at position 3, and audio 423 is no longer shown in the sequence. Audio 423 may have simply been moved further down in content sequence 533 than is shown in operational scenario 500 or may have been deleted from content sequence 533 entirely. Once user 441 is finished with document 421, document 525 is then presented to user 441 as presented content 431 followed in order by video 427, document 527, document 425, social media post 426, and video 422.

Figure 6:
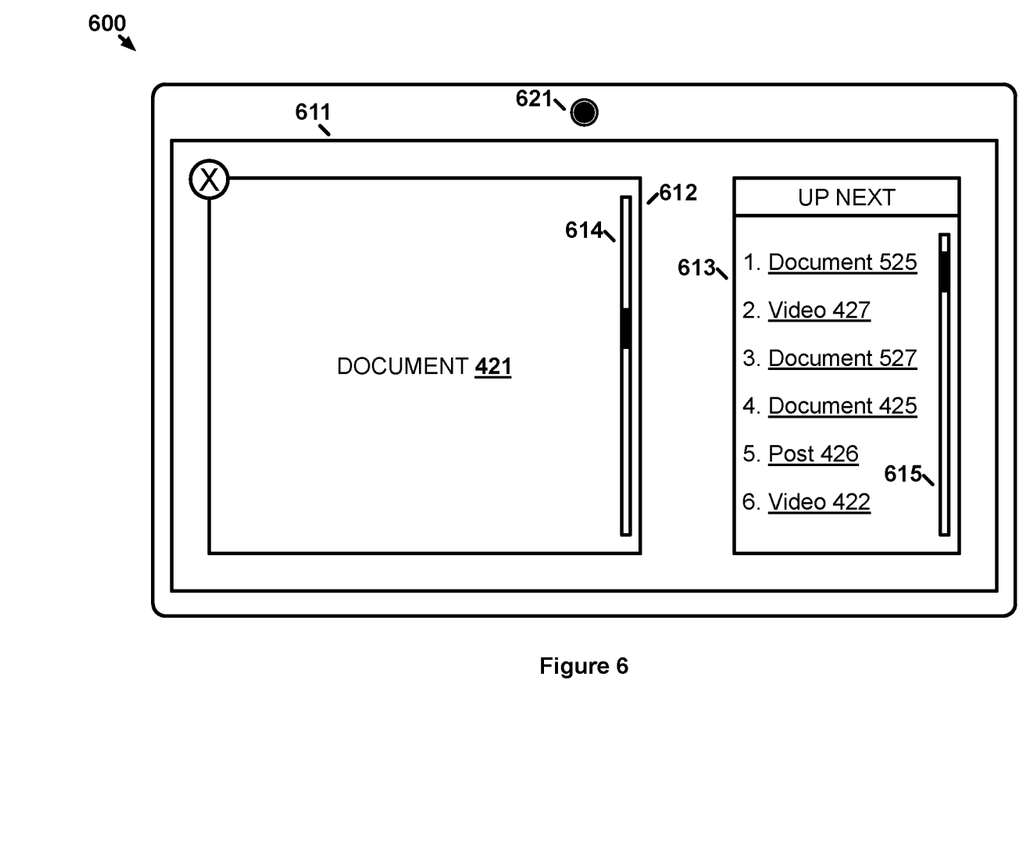
FIG. 6 illustrates a display system for dynamically managing content presentation.

FIG. 6 illustrates display system 600 for dynamically managing content presentation. Display system 600 includes display 611 and user facing camera 621. Display system 600 may be part of a tablet computer, smartphone, laptop computer, desktop computer, stand-alone monitor, or some other type of electronic display apparatus. Display 611 is an example of how presented content 431 and content sequence 533 from operational scenario 500 may be presented. Currently presented content window 612 displays document 421 since document 421 is the currently presented content 431 in operational scenario 500. User 441 may use scroll bar 614 to scroll through document 421 during presentation. During presentation of other types of content items, such as video or audio, scroll bar 614 may be replaced with a media progress bar showing information about the playback of the media, such as run time, time remaining, or some other type of information. It should also be understood that for audio only content items, currently presented content window 612 may only display an identification of the content item (e.g., title) or may display a progress bar, summary of the content item, or some other type of information associated with the audio.

Content sequence window 613 displays content sequence 533 so that user 441 can easily determine what content is going to be presented next. While shown as document 525, video 427, etc., it should be understood that content sequence window 613 may present the titles of the respective content items, and possibly the type of content item (e.g., video, document, etc.), to give user 441 an idea of what is coming up next. User 441 can use content sequence window 613 to scroll further down the list presented in content sequence window 613 to view the identities of other content items in content sequence 533.

In this example, while user 441 is viewing document 421, user facing camera 621 captures physical cues from user 441 so that content service 301 can determine user 441's reaction to document 421 and re-sequence the content items displayed in content sequence window 613 if necessary. User 441 may indicate that they are finished viewing document 421 by selecting the X in the corner of currently presented content window 612, although other manners of user 441 indicating they are done viewing document 421 may also be used, such as selecting a "next" button or upon scrolling past the end of document 421. Document 525 would then be displayed in currently presented content window 612 since document 525 is next up in content sequence 533. The remaining content items in content sequence window 613 would then all move up one slot with video 427 at position 1 indicating that video 427 will be displayed next when user 441 is done viewing document 525. While viewing document 525, user facing camera 621 may continue to capture physical cues from user 441 so that content service 301 can again re-sequence the content items displayed in content sequence window 613 if necessary. As such, the sequence of content items presented to user 441 by display system 600 can dynamically be updated to improve user 441's experience when consuming content on an electronic device.

In some examples, user 441 may also be able to select one of the content items in content sequence window 613 for that content item to be presented in currently presented content window 612 even if it would be out of sequence. In other examples, content sequence window 613 may be omitted such that user 441 is unaware of content sequence 533 before the next content item is presented.

Figure 7:
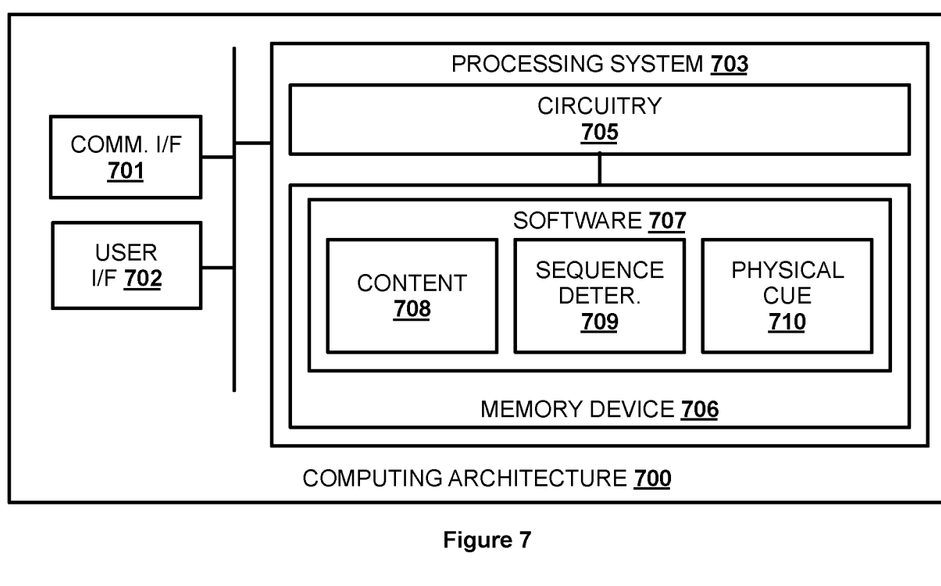
FIG. 7 illustrates a computing architecture for dynamically managing content presentation.

FIG. 7 illustrates computing architecture 700 for dynamically managing content presentation. Computing architecture 700 is representative of any computing system or systems with which the various operational architectures, processes, scenarios, and sequences disclosed herein for an event summary service may be implemented. Computing architecture 700 is an example of content service 101 and 301, although other examples may exist. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707. Computing architecture 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In some implementations, communication interface 701 may be configured to communicate with information and supplemental resources to obtain objects for defining events. Communication interface 701 may further be configured to communicate with client or console devices of end users, wherein the users may request and receive summaries from computing system User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples. In some implementations, user interface 702 may be used in obtaining user summary requests and providing the summary to the requesting user.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes content module 708, sequence determination module 709, and physical cue module 710, although any number of software modules may provide the same operation. Operating software 707 may further include an operating system, utilities, drivers, network interfaces, applications, or some other type of software. When executed by processing circuitry 705, operating software 707 directs processing system 703 to operate computing architecture 700 as described herein.

In one implementation, content module 708 directs processing system 703 to determine first content items for presentation to a user. Sequence determination module directs processing system 703 to determine a first sequence in which the first content items should be presented to the user. During presentation of the first content items in the first sequence to the user, physical cue module 710 directs processing system 703 to identify at least one physical cue from the user. Sequence determination module further directs processing system 703 to modify the first sequence based on the at least one physical cue to create a second sequence in which the first content items should be presented to the user. Content module 708 further directs processing system 703 to present the first content items to the user in the second sequence.

Returning to the elements of FIG. 1, content sources 102 may comprise websites and/or databases capable of providing news stories, social media posts, blog posts, images, and other similar types of objects to content service 101. Content sources 102 may comprise one or more communication interfaces and network interfaces, processing systems, computer systems, microprocessors, storage systems, storage media, or some other processing devices or software systems. Content sources 102 may comprise one or more serving computing systems, desktop computing systems, or some other similar computing system.

Content service 101 comprise communication interfaces and network interfaces, processing systems, computer systems, microprocessors, storage systems, storage media, or some other processing devices or software systems, and can be distributed among multiple devices. Content service 101 may include software such as an operating system, logs, databases, utilities, drivers, networking software, and other software stored on a computer-readable medium.

Communication between the content service 101 and content sources 102 may use metal, glass, optical, air, space, or some other material as the transport media. Communication link 111 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 111 may be a direct link or may include intermediate networks, systems, or devices, and may include a logical network link transported over multiple physical links.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for dynamically managing content presentation, the method comprising:
   determining first content items for presentation to a user;
   determining a first sequence in which the first content items should be presented to the user;
   during presentation of the first content items in the first sequence to the user, identifying at least one physical cue from the user;
   modifying the first sequence based on the at least one physical cue to create a second sequence in which second, yet to be presented, content items of the first content items should be presented to the user; and
   presenting the second content items to the user in the second sequence.

2. The method of claim 1, wherein modifying the first sequence includes:
   determining additional content items for presentation to the user based on the at least one physical cue; and
   amending the first content items with the additional content items in the second sequence.

3. The method of claim 2, wherein amending the first content items comprises:
   adding the additional content items to the first content items.

4. The method of claim 2, wherein amending the first content items comprises:
   replacing one or more of the first content items with the additional content items.

5. The method of claim 1, wherein identifying the at least one physical cue comprises:
   recognizing a first reaction of the user towards currently presented content of the first content items.

6. The method of claim 5, wherein modifying the first sequence to create the second sequence comprises:
   rearranging ones of the second content items to be presented subsequently to the currently presented content to ones of the second content items that will elicit a similar reaction to the first reaction.

7. The method of claim 5, wherein modifying the first sequence to create the second sequence comprises:
   rearranging ones of the second content items to be presented subsequently to the currently presented content to ones of the second content items that will elicit an opposite reaction from the first reaction.

8. The method of claim 5, wherein recognizing the first reaction comprises:
   capturing a facial expression of the user indicating the first reaction.

9. The method of claim 5, wherein recognizing the first reaction comprises:
   measuring a heart rate of the user indicating the first reaction.

10. An apparatus for dynamically managing content presentation, the apparatus comprising:
    one or more computer readable storage media;
    a processing system operatively coupled with the one or more computer readable storage media; and
    program instructions stored on the one or more computer readable storage media that, when read and executed by the processing system, direct the processing system to:
    determine first content items for presentation to a user;
    determine a first sequence in which the first content items should be presented to the user;
    during presentation of the first content items in the first sequence to the user, identify at least one physical cue from the user;
    modify the first sequence based on the at least one physical cue to create a second sequence in which second, yet to be presented, content items of the first content items should be presented to the user; and
    present the second content items to the user in the second sequence.

11. The apparatus of claim 10, wherein to modify the first sequence, the program instructions direct the processing system to:
    determine additional content items for presentation to the user based on the at least one physical cue; and
    amend the first content items with the additional content items in the second sequence.

12. The apparatus of claim 11, wherein to amend the first content items, the program instructions direct the processing system to:
    add the additional content items to the first content items.

13. The apparatus of claim 11, wherein to amend the first content items, the program instructions direct the processing system to:
    replace one or more of the first content items with the additional content items.

14. The apparatus of claim 10, wherein to identify the at least one physical cue, the program instructions direct the processing system to:
    recognize a first reaction of the user towards currently presented content of the first content items.

15. The apparatus of claim 14, wherein to modify the first sequence to create the second sequence, the program instructions direct the processing system to:
    rearrange ones of the second content items to be presented subsequently to the currently presented content to ones of the second content items that will elicit a similar reaction to the first reaction.

16. The apparatus of claim 14, wherein to modify the first sequence to create the second sequence, the program instructions direct the processing system to:
    rearrange ones of the second content items to be presented subsequently to the currently presented content to ones of the second content items that will elicit an opposite reaction from the first reaction.

17. The apparatus of claim 14, wherein to recognize the first reaction, the program instructions direct the processing system to:
    capture a facial expression of the user indicating the first reaction.

18. The apparatus of claim 14, wherein to recognize the first reaction, the program instructions direct the processing system to:
    measure a heart rate of the user indicating the first reaction.

19. One or more computer readable storage media having program instructions stored thereon for dynamically managing content presentation, the program instructions, when read and executed by a processing system, direct the processing system to:
    determine first content items for presentation to a user;
    determine a first sequence in which the first content items should be presented to the user;
    during presentation of the first content items in the first sequence to the user, identify at least one physical cue from the user;
    modify the first sequence based on the at least one physical cue to create a second sequence in which second, yet to be presented, content items of the first content items should be presented to the user; and present the second content items to the user in the second sequence.

20. The one or more computer readable storage media of claim 19, wherein to modify the first sequence, the program instructions direct the processing system to:
  determine additional content items for presentation to the user based on the at least one physical cue; and
  amend the first content items with the additional content items in the second sequence.

* * * * *